United States Patent [19]

Chiles et al.

[11] Patent Number: 4,779,673
[45] Date of Patent: Oct. 25, 1988

[54] FLEXIBLE HOSE HEAT EXCHANGER CONSTRUCTION

[76] Inventors: Daniel T. Chiles, Rte. 1, Box 479A, Ashgrove, Mo. 65604; Richard M. Chiles, 2127 S. Florence, Springfield, Mo. 65807

[21] Appl. No.: 907,791

[22] Filed: Sep. 16, 1986

[51] Int. Cl.⁴ .................. F24D 5/10; F24D 19/02
[52] U.S. Cl. ...................... 165/45; 165/905; 237/69; 126/436; 138/126; 138/137
[58] Field of Search .............. 165/45, 905; 138/124, 138/126, 137; 237/69; 126/436, 442

[56] References Cited

U.S. PATENT DOCUMENTS

| | | | |
|---|---|---|---|
| 2,602,323 | 7/1952 | Leemhuis | 237/69 X |
| 3,568,924 | 3/1971 | Chenault | 237/69 X |
| 3,682,202 | 8/1972 | Buhrmann et al. | 138/126 |
| 3,875,996 | 4/1975 | VonKohorn et al. | 165/45 X |
| 3,988,188 | 10/1976 | Johansen et al. | 138/126 X |
| 3,991,937 | 11/1976 | Heilemann | 237/69 X |
| 4,257,481 | 3/1981 | Dobson | 126/436 X |
| 4,306,591 | 12/1981 | Arterburn et al. | 138/124 X |
| 4,308,896 | 1/1982 | Davis | 138/126 |
| 4,617,213 | 10/1986 | Asano et al. | 138/126 X |
| 4,693,300 | 9/1987 | Adachi | 165/45 X |
| 4,693,301 | 9/1987 | Baehrle et al. | 165/45 |

Primary Examiner—Ira S. Lazarus
Assistant Examiner—Peggy Neils
Attorney, Agent, or Firm—Kokjer, Kircher, Bradley, Wharton, Bowman & Johnson

[57] ABSTRACT

A heat exchanger construction for melting snow, heating buildings or objects and transferring solar heat. The construction embodies a flexible, multilayered, reinforced composite hose embedded in or affixed to a slab or other body. The composite construction combines the advantages of metal, extruded rubber and plastic piping to produce substantial durability, pressure rating, resistance to oxygen permeation, temperature tolerance, and corrosion resistance, while remaining extremely flexible and thus easy to install. Three embodiments are described and illustrated.

18 Claims, 2 Drawing Sheets

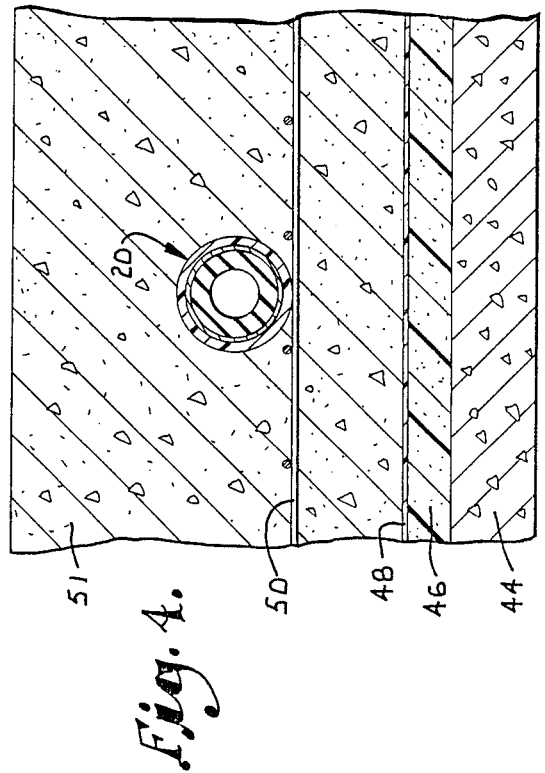
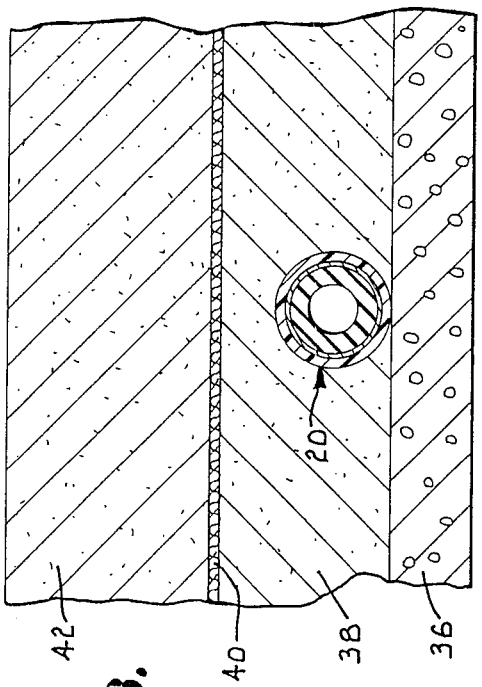
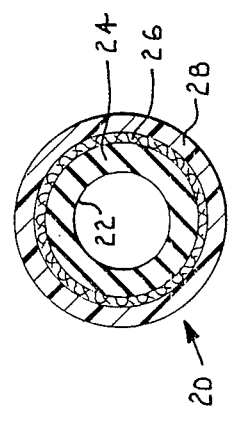
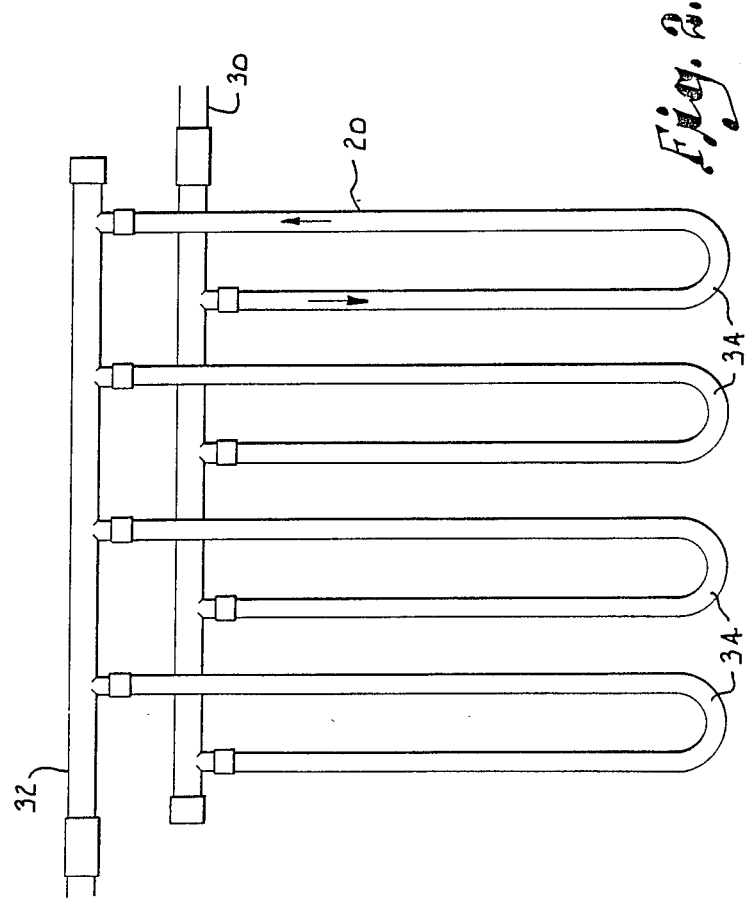

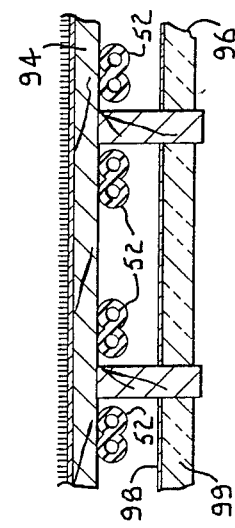
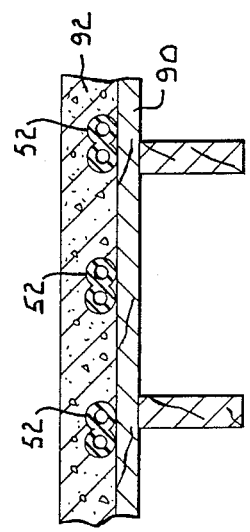
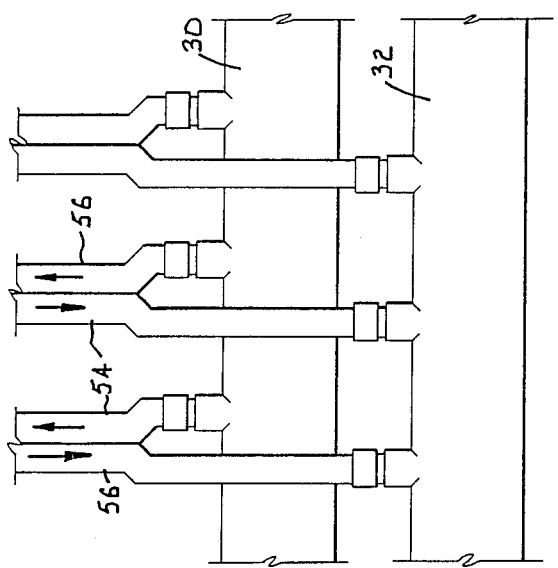
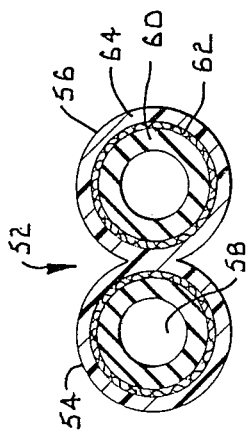
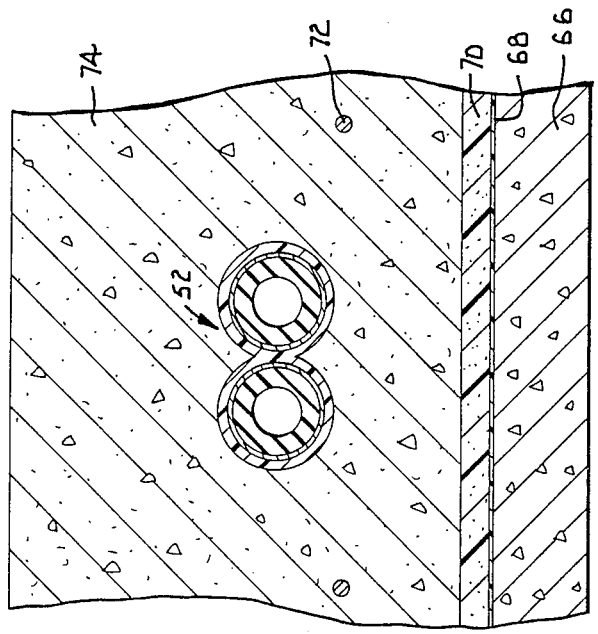

FLEXIBLE HOSE HEAT EXCHANGER CONSTRUCTION

BACKGROUND OF THE INVENTION

This invention relates to heat exchanger constructions, and in particular to improvements in heat exchangers embedded in concrete and asphalt to remove ice and snow from public areas, or to provide radiant heat from an interior floor, or to recover solar heat. Also the invention can be used as a heat exchanger for other purposes, such as ceiling surfaces, transport vehicles, hoppers, chutes, transport cars and other areas of industrial process.

Every year thousands of pedestrians suffer injuries when they slip and fall on ice and snow surfaces including driveways, parking lots, roadways, walkways or sidewalks made of concrete, masonry, or asphalt. Even after plowing and shoveling, a thin layer of ice usually remains to endanger those on foot and to be tracked into the building where it melts and forms slippery wet spots. The floor inside a building must be mopped dry and extra doormats provided to prevent accidents inside as well as outside the building. These injuries increase liability insurance premiums significantly, discourage customers in bad weather and thus raise the cost of doing business.

Salt is used to remove ice, but it must be applied often because it is easily washed away and it has virtually no effect upon heavy snowfall. Salt is corrosive, harming automobiles, damaging doors, fittings, trim and shopping carts. Salt also weakens the glue bond on floor tile, discolors carpets and wood molding and is an environmental hazard to many communities.

One practical solution to ice covered walkways is to warm the surface by heating the mass below. This approach can be used for space heating by warming the floor of agricultural, industrial, commercial and residential buildings. Floor heat is an explosion resistant, quiet, clean, economical, and even heat that can use a variety of fuel sources to keep floors warm and dry.

Several snowmelting/floorheating systems have been used in concrete. Electrical resistance wires have been embedded to heat the concrete to keep it warm. These wires are easy to install, but they are fragile and likely to break as the concrete settles and cracks. These breaks are difficult to locate and repair. Electric resistance systems are also very expensive to operate, because they use electricity rather than economical fuel sources like natural gas or waste heat or heat from renewable resources.

Tubes have also been embedded in concrete to convey a heated fluid which in turn conducts warmth to the surrounding concrete for the purpose of snowmelting and space heating. These tubes are made of iron or copper and more recently of polybutylene, polyethylene, or EPDM (ethylene propylene diene monomer). Metal tubes are difficult, time consuming, and expensive to install. Numerous joints are required and each joint presents a potential leak. The tubes are installed over a gravel base, and before they can be covered up, trucks and construction equipment are likely to be driven over them, deforming and displacing the tubes and weakening the joints. When metal tubing is used in concrete, leaks are often caused either by slab settling or by corrosion caused from the reaction of the concrete and metal. Metal tubes are unsatisfactory in asphalt. Metals and asphalt have significantly different co-efficients of thermal expansion and thus cycles of temperature change cause the metal to expand and the asphalt to crack.

Polypropylene and other plastic tubing have been used in concrete, although they have many important limitations. Plastic tubes allow atmospheric oxygen to enter the system resulting in severe corrosion of the pumps, boilers, and other metal parts. Rigid plastic tubes cannot withstand abuse from trucks and construction vehicles occurring between the time the tubes are laid and unprotected and the time they are covered with concrete or masonry materials. Plastic tubing and especially EPDM tubing embedded in concrete is also subject to attack from petroleum distillates, solvents, cleaning fluids and other agressive chemicals that seep through cracks which develop in the concrete as it ages. Polybutylene, polypropylene and polyethylene plastic tubes are subject to complete failure at temperatures exceeding 220° F. when control systems or boilers allow fluid temperatures to exceed that temperature for a certain period (a condition known as "boiler runaway"). The entire system may be irreparably damaged.

Metal and some plastic tubing are subject to severe damage when the fluid inside is accidentally allowed to freeze. Water frozen in rigid metal or some plastic tubes can damage the floor and cause water damage to the building and furnishings.

Plastic tubing is unsatisfactory in asphalt. Asphalt is applied at about 275°-350° F. and is then rolled and compacted. Plastic tubing is incapable of withstanding the elevated temperatures and pressures of asphalt application.

Thus, while there are some techniques for melting snow and ice from the surface of concrete slabs, there has been no acceptable way to melt snow and ice from the surface of asphalt. Prior art includes the use of hose to conduct fluids, but applicants have invented an improved hose construction that is designed to emit radiation as well as conduct fluids. Hose is generally designed as and thought to be an insulated conduit; but the new construction is designed to efficiently release heat to air, water or solid environments. In contrast to prior art metal pipe, plastic pipe, hose or elastomeric extrusions, applicants' improved hose construction works in concrete or asphalt, is easier and less expensive to install, is immune to most oils and cleaning agents, resists invasion from corrosion-causing atmospheric oxygen, works at higher fluid temperatures, is not damaged by freezing fluids within, is crush and abrasion resistant, has no joints under floor, is more reliable, and lasts longer. The construction makes automatic ice and snow melting available for the first time in the millions of square feet of asphalt laid each year.

SUMMARY OF THE INVENTION

The hose construction includes a multilayer composite hose having a channel therethrough for the passage of a heat transfer fluid and comprising an inner layer of a flexible, high temperature polymeric material such as EPDM. The inner layer is covered by a woven layer of rayon or polyester fiber for reinforcement. Finally, the hose is sheathed in a cover of polymeric materials such as CPE (chlorinated polyethylene) and others, and is highly resistant to chemicals, oxygen and high temperatures. These hoses may be used alone or joined together in a twin hose counterflow design and then embedded in concrete or asphalt.

This hose is very flexible and easy to work with. This hose can be bent in a tight radius so that no joints or connectors have to be embedded where they cannot be serviced. In fact, the hose is sufficiently flexible that it can be formed in a circle or arc having a diameter only about five times the diameter of the hose. Even when formed in such a circle or arc, the hose is not kinked and the flow of fluid through the hose is not significantly impeded. The outer cover resists the chemicals in the asphalt, as well as oils, cleaning fluids, and other chemicals that might seep through the concrete or asphalt.

This hose is also much more inpermeable to oxygen than prior plastic and synthetic rubber tubes, resulting in less corrosion and much longer life for the steel and iron components of the system. The outer cover also resists the high temperatures used in applying asphalt, and the entire hose is capable of operating under pressure for extended periods of time at temperatures far exceeding 220° F. The co-efficient of thermal expansion of this hose and of asphalt are very similar, so the hose and asphalt expand and contract at about the same rate protecting the integrity of the hose and asphalt. The reinforcing layer gives the hose sufficient strength to withstand abuse from trucks and construction vehicles while it is being installed and before it is covered with asphalt or concrete. This resistance allows the hose to be carefully arranged without disrupting the construction schedule or blocking access to parts of the construction site.

The hose is preferably spaced about six to twenty-four inches apart. A boiler heats an anti-freeze solution or water and a pump circulates it. Electric controls can be used to actuate the system, for example based upon the surface temperature and evidence of precipitation. Various modifications can be made to the hose. For example, the inner layer of the hose can be made more chemically resistant so that a variety of heat transfer fluids can be used, making it possible to reclaim waste heat from various industrial and commercial processes without intervening heat exchangers. Fungicides and algicides can also be incorporated into the inner layer to retard growth of undesirable organisms in the heat transfer fluid. The external layer can also be made resistant to particular chemicals that may be encountered in a particular installation. Iron oxide may also be incorporated to facilitate the location of the hose after it is covered. Both the inner tube and the outer cover may contain certain carbon compounds including graphite to enhance the heat transfer performance of the hose construction. Certain powdered metals including aluminum, iron, copper, titanium, and others may also be incorporated for this purpose.

Uneven heat distribution has been a significant problem with prior art constructions utilizing a single fluid path. As the fluid transverses a single pipe, it becomes progressively cooler before it returns to the heat source. The net result is that some areas of the floor are too hot and some areas are too cool. This problem has been addressed in the past by costly pipe layout design on each jobsite and with expert installation by experienced installers. Uneven heat distribution is a particular problem in apartments, residences and offices where small temperature variations may cause a large degree of discomfort.

One embodiment of applicants' invention solves these problems by joining two hoses together in the manufacturing process and then plumbing the two joined hoses into return and supply manifolds so that the two fluid paths are flowing in parallel, but also in opposite directions.

Assuming proper flow rates and fluid path lengths, the average temperature of the two joined hoses remains very constant over their combined length, typically differing by less than 1° F. The result is excellent heat distribution for occupant comfort and more complete snow removal. Prior art includes an elastomeric extrusion of multiple tubes, but this construction is hard to bend around corners, will not withstand high pressures or temperatures, abrasion from construction traffic, exposure to petroleum solvents and cleaning fluids and suffers from other limitations resulting from its manufacture as an extrusion of a single material. In particular, these prior art elastomeric counterflow extrusions will fail at 280° F. under 20 psi or temperatures as low as 100° F. under 100 psi. By contrast, the hose of this invention will withstand fluid temperatures and pressures of up to 400° F. and 1000 psi.

In addition to snowmelting or space heating, the hose construction of this invention can be used as a solar collector. Concrete or asphalt is warmed by the sun and fluid conducted through the hose gathers that heat and conducts it to storage tanks or for immediate use such as warming a swimming pool, preheating domestic hot water, or for some other purpose.

BRIEF DESCRIPTION OF THE DRAWINGS

FIG. 1 is a cross-sectional view of a first embodiment of this invention, illustrating a hose used in the heat exchanger construction of this invention;

FIG. 2 is a schematic view showing several of the hoses of FIG. 1 connected to a supply and a return manifold and showing how the hoses extend into an area to be heated;

FIG. 3 is an enlarged cross-sectional view of the composite hose of FIG. 1 embedded in asphalt for snowmelting and/or floor heating;

FIG. 4 is an enlarged cross-sectional view of the composite hose of FIG. 1 embedded in concrete for snowmelting and/or floor heating;

FIG. 5 is a cross-sectional view of a second embodiment of this invention showing a dual hose construction designed to promote even heat distribution for snowmelting and/or floor heating;

FIG. 6 is a cross-sectional view of the dual hose construction of FIG. 5 installed in masonry or concrete;

FIG. 7 is a schematic view showing one method of attaching a dual hose to supply and return manifolds and illustrating the counterflow heat exchange principle;

FIG. 8 is a cross-sectional view illustrating an above-floor installation of the hose; and FIG. 9 is a cross-sectional view illustrating a below-floor installation of the hose.

DETAILED DESCRIPTION OF THE PREFERRED EMOBODIMENTS

The hose 20 used in the heat exchanger construction of this invention is shown in cross-section in FIG. 1. The hose 20 has an inner wall or layer 22 that defines a conduit for conducting a heat transfer fluid, an inner layer of high temperature polymeric material 24, a reinforcing layer of fabric braid 26, and a cover 28 of polymeric material. The inner layer 24 is preferably ethylene proplylene diene monomer (EPDM), SBR or Neoprene. The inner layer 24 can also be made resistant to a variety of heat transfer liquids that might be carried in the conduit 22. The fabric braid 26 is preferably made of woven rayon, nylon, or polyester thread. The braid 26 is tightly wound over the inner layer 24 to increase the pressure resistance and puncture resistance of the hose 20. The braid is preferably a 2 over 2 basket weave or a spiral weave, although other weaves may be acceptable. The cover 28 is preferably a chlorinated polyethylene (CPE), nitrile, nitrile-PVC, EPDM, Neoprene, Hypalon, or Chlorobutyl, depending on the specific environmental conditions it is designed to withstand. The cover 28 protects the hose 20 from oils and petroleum distillates present in asphalt or from solvents, cleaning fluids, or other chemicals that might leak through the concrete or asphalt in which the hose 20 is embedded. Either or both the inner wall 22 and the cover 28 may incorporate carbon compounds, including graphite, to enhance the heat transfer performance of the hose construction. Certain powdered metals, such as aluminum, iron, copper, titanium, may also be incorporated for this purpose The outer diameter of the hose 20 preferably is within the range of ¼" to 2", although other sizes could be used.

According to this invention the hose 20 is embedded in slabs of concrete or asphalt to transfer heat to or from the slabs. The hose is sufficiently flexible to accommodate crackihg or settling of the concrete or asphalt. The hose 20 has approximately the same co-efficient of thermal expansion as asphalt so that temperature cycles do not stress the hose 20 or the asphalt. The hose 20 extends between supply and return manifolds which can be positioned on the same side or on opposite sides of the slab. The hose 20 is preferably evenly spaced on 6 to 24 inch centers.

FIG. 2 is a schematic view of one possible arrangement of the hose 20. As shown in FIG. 2, a supply manifold 30 and a return manifold 32 are positioned adjacent each other. The manifolds are preferably made of copper and each has a plurality of threaded male or barbed connectors as are known in the art. Loops 34 of the hose 20 extend between the manifolds 30 and 32, the ends of each of the loops 34 having a threaded female connector for engaging the male connectors on the manifolds 30 and 32 in a fluid-tight connection or the hose ends alternatively may slide on a barbed connector on the manifold. The connections between the loops 34 and the manifold are preferbly not embedded in the slabs, thereby providing access for servicing. As already mentioned, the diameter of each loop 34 can be as small as about five times the outside diameter of the hose 20.

FIG. 3 is a cross-sectional view showing the hose of this invention embedded in asphalt. A bed of crushed rock 36 is prepared on the surface of the ground. The hose 20 formed with the loops 34 as shown in FIG. 2 is then arranged over the base 36. The toughness of the hose allows the loops 34 to be carefully positioned, since the hose 20 can resist the abuse from trucks and construction equipment until it is covered. Once the loops 34 are positioned, they are connected to the manifolds 30 and 32 as in FIG. 2. Then, while forming the hot asphalt over the hose loops, heat conducting fluid can be circulated through the hose which helps maintain the shape of the hose during compaction of the asphalt. The cover 28 helps the hose 20 to resist the high temperatures of the asphalt which range between 275°-350° F. during application. The cover 28 also protects the hose from the oils and petroleum distillates in the asphalt.

An environmental fabric layer 40 is put over the first asphalt layer 38. A second asphalt layer 42 is then put over the fabric layer 40.

A heat transfer fluid can then be circulated through the conduit 22 in the hose 20 to heat the asphalt construction to melt snow and ice on the surface and to dry the surface. This heat transfer fluid can be a fluid heated specifically for this purpose, or a fluid containing waste heat from some other process. A heat transfer fluid can also be circulated through the conduit 22 in the hose 20 to collect heat retained by the asphalt from the sun. This heat can then be used to heat water, or for some other purpose.

FIG. 4 is a cross-sectional view showing the hose 20 embedded in concrete. A bed of gravel 44 is prepared on the ground surface. A layer 46 of polystyrene insulation is laid over the bed of gravel 44. A polyethylene vapor barrier 48 is then laid over the insulation layer 46. The insulating layer 46 and vapor barrier 48 are optional, and are preferably used in constructing a concrete slab for radiant floor heating. A wire mesh 50 is then placed over the area and loops 34 (FIG. 2) of the hose 20 are arranged over the mesh 50. The loops 34 are then connected to the manifolds 30 and 32. A layer of concrete 51 is then poured over the hose 20. The cover 28 of the hose 20 protects the hosing from oils, cleaning agents, solvents and other chemicals that may be spilled or used above the concrete. As noted above, the hose 20 also resists the introduction of oxygen into the system.

A heat transfer fluid can then be circulated through the conduit 22 in the hose 20 to heat the concrete to melt snow and ice on the surface and even to dry the surface. The construction can also be used inside a building as a radiant floor heater. The construction can also be used as a solar collector, collecting the heat absorbed by the concrete from the sun.

FIG. 5 is a cross-sectional view of a twin hose embodiment of this invention for use in concrete or in thin slab masonry environments. The twin hose 52 comprises two hoses 54 and 56. Each of the two hoses 54 and 56 of the twin hose 52 is similar to the hose 20, each comprising an inner wall 58 defining a conduit for conducting heat transfer fluids, an inner layer of high temperature polymeric material 60, a reinforcing layer of fabric braid 62, and a cover 64 of EPDM, nitrile, nitrile-PVC, CPE, Neoprene, Hypalon or Chlorobutyl polymeric material.

FIG. 6 is a cross-sectional view of the twin hose embodiment of the invention shown in FIG. 5. A bed of gravel 66 is prepared on the surface. A polyethylene vapor barrier 68 is laid over the gravel bed 66. An insulating layer 70 can be laid over the vapor barrier 68. Reinforcing steel rods 72 are placed over the area and loops 80 (in FIG. 8) of the twin hoses 52 (in FIG. 6) are arranged over the reinforcing rods.

As FIG. 7 shows, the ends of the hoses 54 and 56 of the twin hoses 52 are connected to the supply manifold 30 and return manifold 32 to establish a counter flow between the hoses 54 and 56. A layer of concrete 74 or other masonry material is then poured over the twin hoses 52 (FIG. 6). The direction of flow in hoses 54 and 56 is indicated by arrows in FIG. 7.

The connection of the twin hoses 52 is shown in FIG. 7. At one end of a loop of the twin hoses 52, hose 54 is connected to a supply conduit 30 and hose 56 is connected to return conduit 32. At the other end of the same loop of the twin hoses 52, the hose 54 is connected to return conduit 32 and the hose 56 is connected to supply conduit 30. This establishes a counter flow in the hoses 54 and 56 of the twin hoses 52. This construction ensures that the average temperature of both halves of the twin hoses 52 remains constant throughout the entire path length and thus equalizes the temperature within the entire heated slab. Because the twin hoses 52 have a uniform temperature over their entire length, the twin hoses 52 are particularly suited for heating buildings, where even small variations in the distribution of the heat can cause occupant discomfort. However, the twin hoses 52 can also be used for melting snow and ice or collecting solar heat, all as described above.

FIGS. 8 and 9 illustrate two alternative means of installations of the hose 20. The twin hose embodiment 52 is illustrated, but this is not to suggest that this is a preferred embodiment for these two applications. In FIG. 8, a hose 52 is laid down on a supporting structure or subfloor 90. A thin slab of concrete, light weight concrete, masonry, or similar material 92 is poured or placed on top of the subfloor 90 embedding the hose 52 in a matrix.

Another application, shown in FIG. 9, is to fasten, adhere, or place the hose 52 underneath a floor without a slab. This application requires higher fluid temperatures to drive the heat through the floor 94, so an insulating material 96 must be installed underneath the floor. An important component of the insulating system is a radiant barrier 98, comprised of a reflective material such as aluminized mylar or aluminum foil. Additional insulation in the form of fiberglass batts or foam board 99 is often required.

There are various changes and modifications which may be made to the invention as would be apparent to those skilled in the art. However, these changes or modifications are included in the teaching of the disclosure, and it is intended that the invention be limited only by the scope of the claims appended hereto.

We claim:

1. In a concrete slab, a heat exchanger construction comprising:
    flexible hosing embedded in the slab below the top surface of the concrete therein, said hosing having an inner layer of high temperature elastomeric polymer material arranged to present a conduit through the hosing for the receipt of heat transfer fluid circulated through the conduit to transfer heat to or from the concrete slab;
    a fabric braid in said hosing surrounding said inner layer to reinforce the hosing; and
    an elastomeric polymer cover surrounding said fabric braid in the hosing, said cover being resistant to solvents and chemicals to withstand chemical attack resulting from seepage through the concrete slab.

2. The invention of claim 1, including a supply manifold for directing the heat transfer fluid to said hosing and a return manifold for directing the heat transfer fluid away from the hosing, said hosing being arranged in a plurality of loops each having one end connected with the supply manifold and another end connected with the return manifold.

3. The invention of claim 2, wherein said manifolds and the connections between the manifolds and loops are located outside of the concrete slab.

4. The invention of claim 1, wherein the fabric braid is selected from woven rayon, polyester and nylon.

5. The invention of claim 1, wherein said inner layer is selected from EPDM, SBR and neoprene.

6. The invention of claim 1, wherein said cover is selected from a chlorinated polyethylene, nitrile, nitrile-PVC, neoprene and Hypalon.

7. The invention of claim 1, wherein the inner layer incorporates an algicide.

8. The invention of claim 1, wherein the inner layer incorporates a fungicide.

9. The invention of claim 1, wherein the inner layer incorporates a bacteriacide.

10. A heat exchanger construction comprising:
    a slab of asphalt laid at an elevated temperature and containing oil and petroleum distillates;
    flexible hosing embedded in said slab below the top surface of the asphalt therein, said hosing having an inner layer of high temperature elastomeric polymer material defining a conduit through which heat transfer fluid is circulated to transfer heat to or from the slab;
    a fabric braid in said hosing surrounding said inner layer to reinforce the hosing; and
    an elastomeric polymer cover surrounding said fabric braid in the hosing, said cover being resistant to the oil and petroleum distillates in the asphalt and being resistent to the elevated temperature at which the slab is laid.

11. The invention of claim 10, including a supply manifold for directing the heat transfer fluid to said hosing and a return manifold for directing the heat transfer fluid away from the hosing, said hosing being arranged in a plurality of loops each having one end connected with the supply manifold and another end connected with the return manifold.

12. The invention of claim 11, wherein said manifolds and the connections between the manifolds and loops are located outside of the asphalt slab.

13. The invention of claim 10, wherein the fabric braid is selected from woven rayon, polyester and nylon.

14. The invention of claim 10, wherein said inner layer is selected from EPDM, SBR and neoprene.

15. The invention of claim 10, wherein said cover is selected from a chlorinated polyethylene, nitrile, nitrile-PVC, neoprene and Hypalon.

16. The invention of claim 10, wherein the inner layer incorporates an algicide.

17. The invention of claim 10, wherein the inner layer incorporates a fungicide.

18. The invention of claim 10, wherein the inner layer incorporates a bacteriacide.

* * * * *